(12) United States Patent
Dionne et al.

(10) Patent No.: US 10,036,456 B2
(45) Date of Patent: Jul. 31, 2018

(54) DRIVE ASSEMBLY PROVIDED WITH A CONTINUOUSLY VARIABLE TRANSMISSION AND A DIRECTION REVERSING MECHANISM

(71) Applicant: TRANSMISSION CVTCORP INC., Sainte-Julie (CA)

(72) Inventors: Jean-Francois Dionne, La Prairie (CA); Daniel Girard, Beloeil (CA)

(73) Assignee: TRANSMISSION CVTCORP INC., Sainte-Julie (CA)

( * ) Notice: Subject to any disclaimer, the term of this patent is extended or adjusted under 35 U.S.C. 154(b) by 109 days.

(21) Appl. No.: 15/039,498

(22) PCT Filed: Nov. 26, 2014

(86) PCT No.: PCT/CA2014/051130
§ 371 (c)(1),
(2) Date: May 26, 2016

(87) PCT Pub. No.: WO2015/077883
PCT Pub. Date: Jun. 4, 2015

(65) Prior Publication Data
US 2017/0002907 A1  Jan. 5, 2017

Related U.S. Application Data

(60) Provisional application No. 61/910,141, filed on Nov. 29, 2013.

(51) Int. Cl.
*F04D 19/00* (2006.01)
*F16H 37/02* (2006.01)
(Continued)

(52) U.S. Cl.
CPC ......... *F16H 37/022* (2013.01); *F04D 19/002* (2013.01); *F04D 19/005* (2013.01);
(Continued)

(58) Field of Classification Search
CPC .. F04D 19/005; F16H 15/38; F16H 2037/026; F16H 37/021; F16H 37/022
See application file for complete search history.

(56) References Cited

U.S. PATENT DOCUMENTS

| 4,638,687 A * | 1/1987 | De Brie Perry | F16H 15/38 475/190 |
| 6,422,966 B1 * | 7/2002 | Haka | F16H 37/086 475/216 |

(Continued)

FOREIGN PATENT DOCUMENTS

| CA | 2784375 A1 | 6/2011 |
| WO | 2010066059 A2 | 6/2010 |

(Continued)

OTHER PUBLICATIONS

International Search Report and Written Opinion dated Feb. 12, 2015 in connection with PCT/CA2014/051130.

*Primary Examiner* — Sherry L Estremsky
(74) *Attorney, Agent, or Firm* — Quarles & Brady LLP

(57) ABSTRACT

A drive assembly including a CVT and a direction reversing mechanism is described herein. The direction reversing mechanism is such that the output of the drive assembly may rotate at variable speed in a first direction and at a fixed speed in a second direction.

9 Claims, 8 Drawing Sheets

(51) Int. Cl.
*F04D 25/10* (2006.01)
*F04D 25/02* (2006.01)
*F16D 41/00* (2006.01)
*F16H 15/38* (2006.01)

(52) U.S. Cl.
CPC .......... *F04D 25/02* (2013.01); *F04D 25/028* (2013.01); *F04D 25/10* (2013.01); *F16D 41/00* (2013.01); *F16H 37/021* (2013.01); *F16H 15/38* (2013.01); *F16H 2037/026* (2013.01)

(56) References Cited

U.S. PATENT DOCUMENTS

| | | | | |
|---|---|---|---|---|
| 6,494,805 | B2* | 12/2002 | Ooyama | F16H 37/086 475/207 |
| 7,278,939 | B2* | 10/2007 | Sato | F16H 37/021 474/72 |
| 7,513,349 | B2* | 4/2009 | Houle | F16D 21/06 192/48.2 |
| 8,915,811 | B2* | 12/2014 | Horiike | F16H 37/021 474/8 |
| 9,371,896 | B2* | 6/2016 | Kobayashi | F16H 37/021 |
| 9,382,986 | B2* | 7/2016 | Peterson | F16H 3/006 |
| 2017/0146121 | A1* | 5/2017 | Tsuchida | F16H 61/702 |

FOREIGN PATENT DOCUMENTS

| WO | 20111131353 A1 | 9/2011 |
|---|---|---|
| WO | 2014039708 A1 | 3/2014 |

* cited by examiner

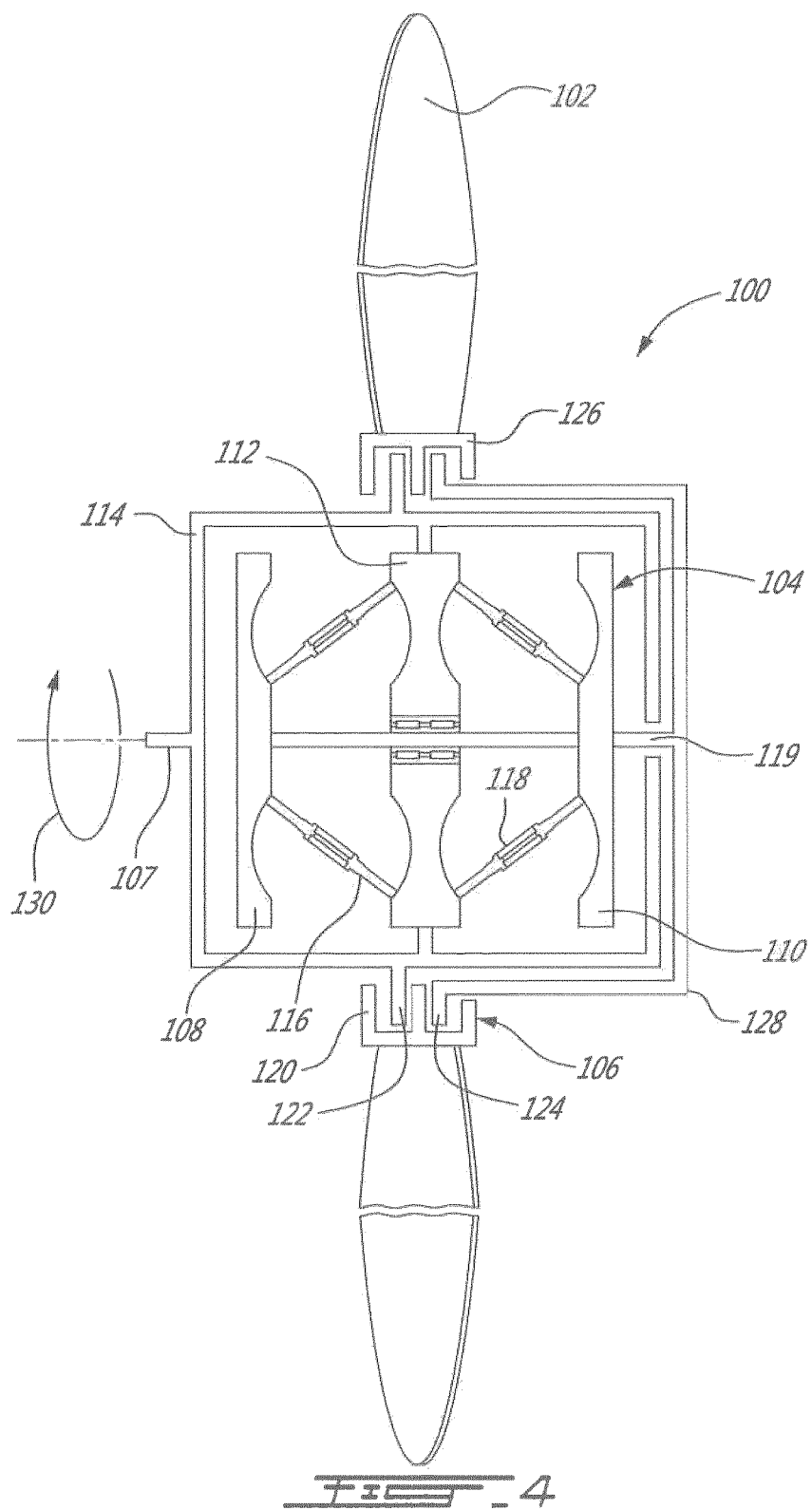

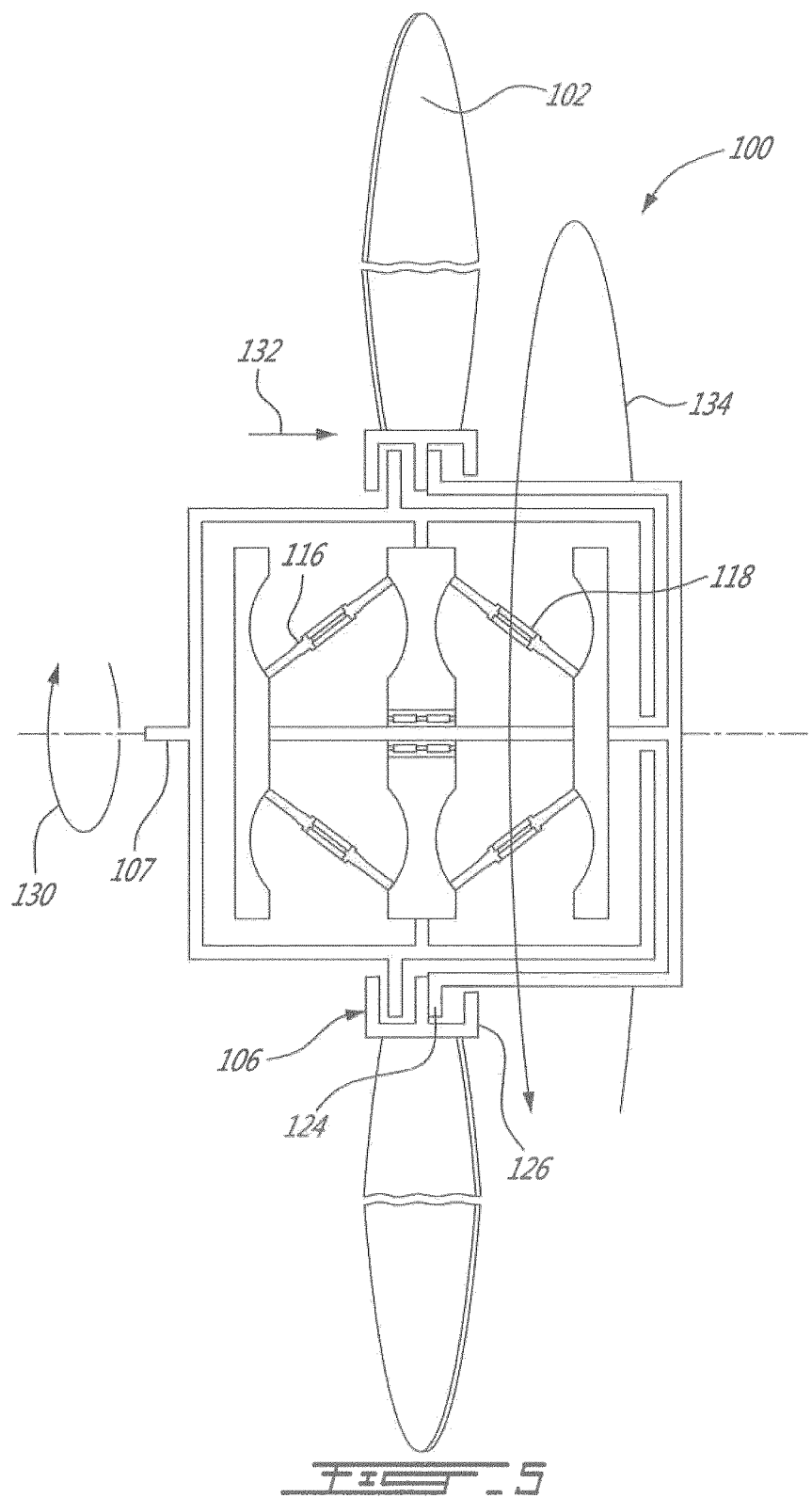

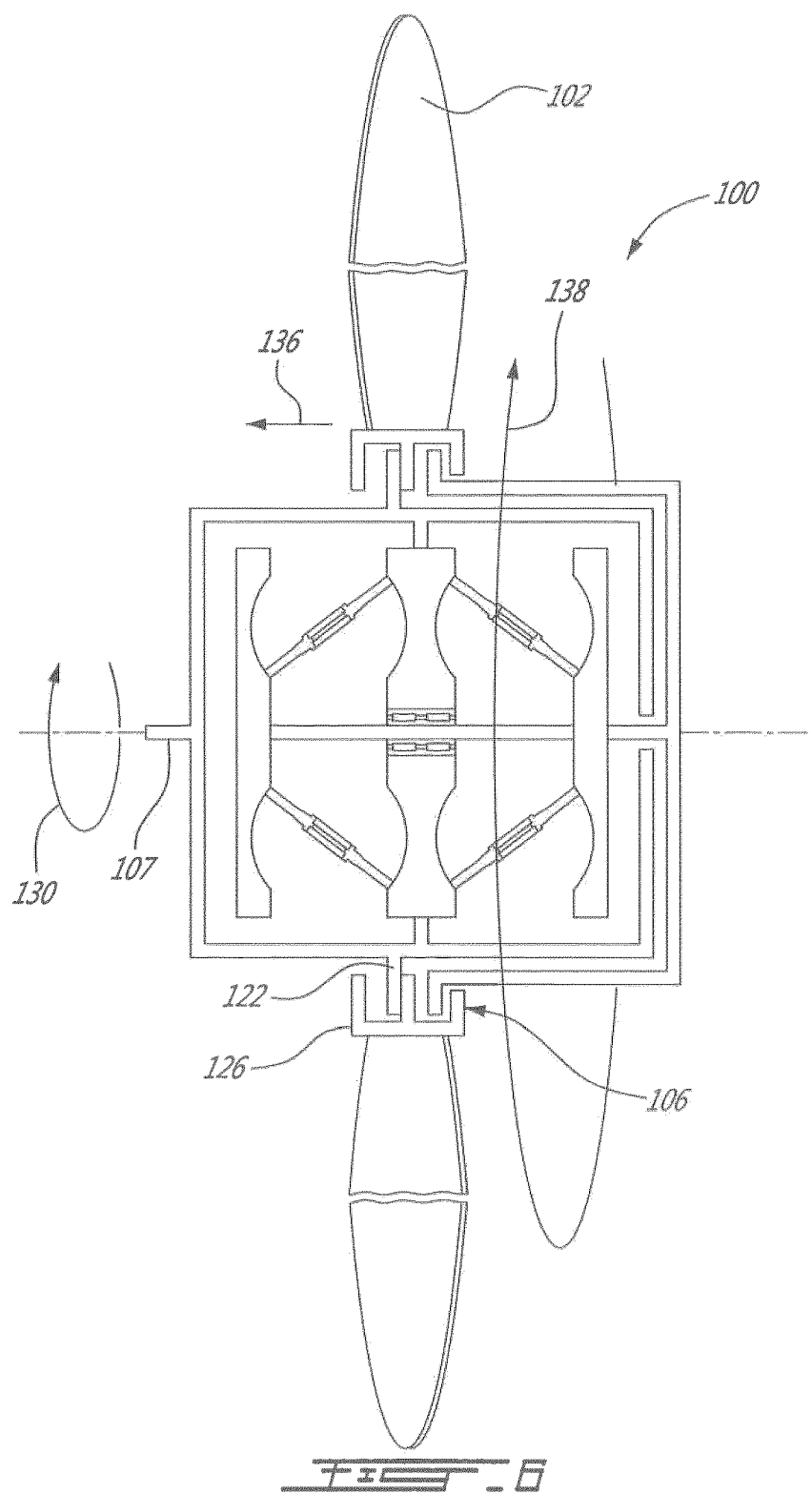

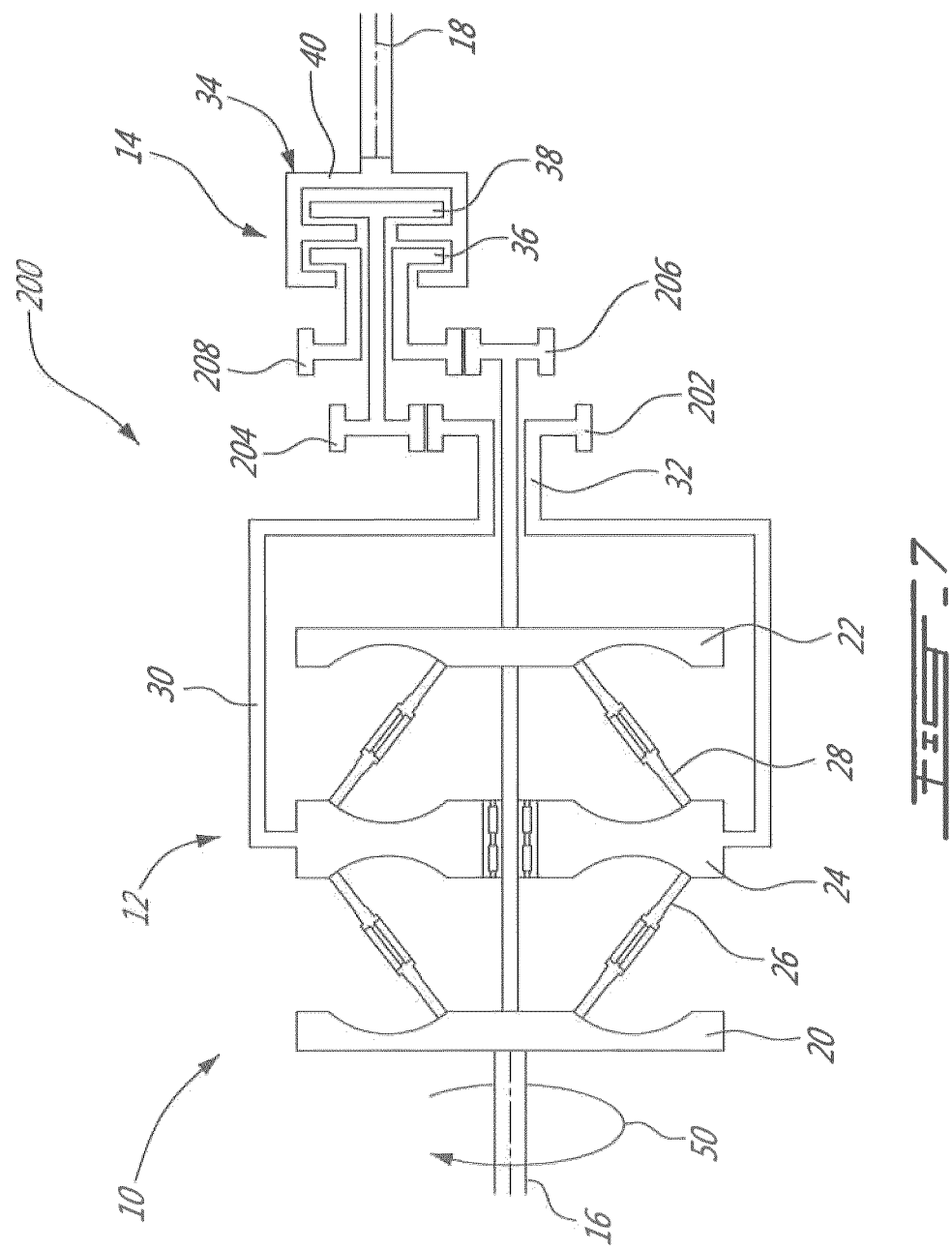

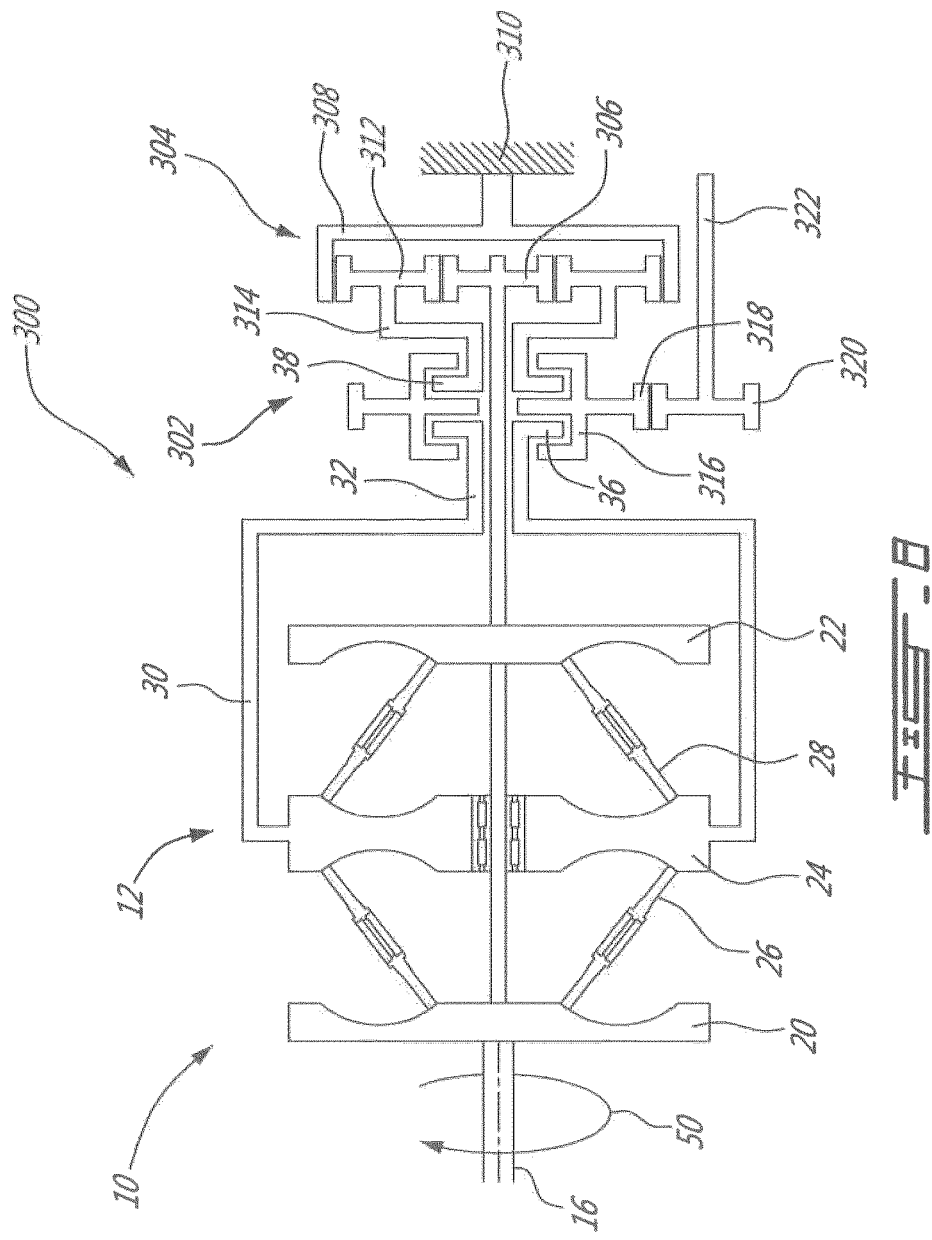

ves provided with a Continuously Variable Transmission (hereinafter referred to as CVTs). More specifically, the present disclosure is concerned with such a drive assembly also provided with a direction reversing mechanism for a CVT.

DRIVE ASSEMBLY PROVIDED WITH A CONTINUOUSLY VARIABLE TRANSMISSION AND A DIRECTION REVERSING MECHANISM

This application is a 371 application of PCT/CA2014/051130 filed Nov. 26, 2014, which claims priority from U.S. Provisional Patent Application Ser. No. 61/910,141 filed Nov. 29, 2013, both of which are incorporated herein by reference for all purposes.

FIELD

The present disclosure generally relates to drive assemblies provided with a Continuously Variable Transmission (hereinafter referred to as CVTs). More specifically, the present disclosure is concerned with such a drive assembly also provided with a direction reversing mechanism for a CVT.

BACKGROUND

CVTs are well known in the art. They generally transform a fixed speed input into a variable speed output.

It is generally mechanically complicated to provide a mechanism allowing the direction of the output to be reversible.

BRIEF DESCRIPTION OF THE DRAWINGS

In the appended drawings:

FIG. 4 is a schematic view of a drive assembly according to a second illustrative embodiment, shown in a neutral position;

FIG. 5 is a schematic view of the drive assembly of FIG. 4, shown in a position where the output shaft rotates in a first direction;

FIG. 6 is a schematic view of the drive assembly of FIG. 4, shown in a position where the output shaft rotates in a second direction;

FIG. 7 is a schematic view of a drive assembly according to a third illustrative embodiment, shown in a neutral position; and FIG. 8 is a schematic view of a drive assembly according to a fourth illustrative embodiment, shown in a neutral position.

DETAILED DESCRIPTION

Figure 1:
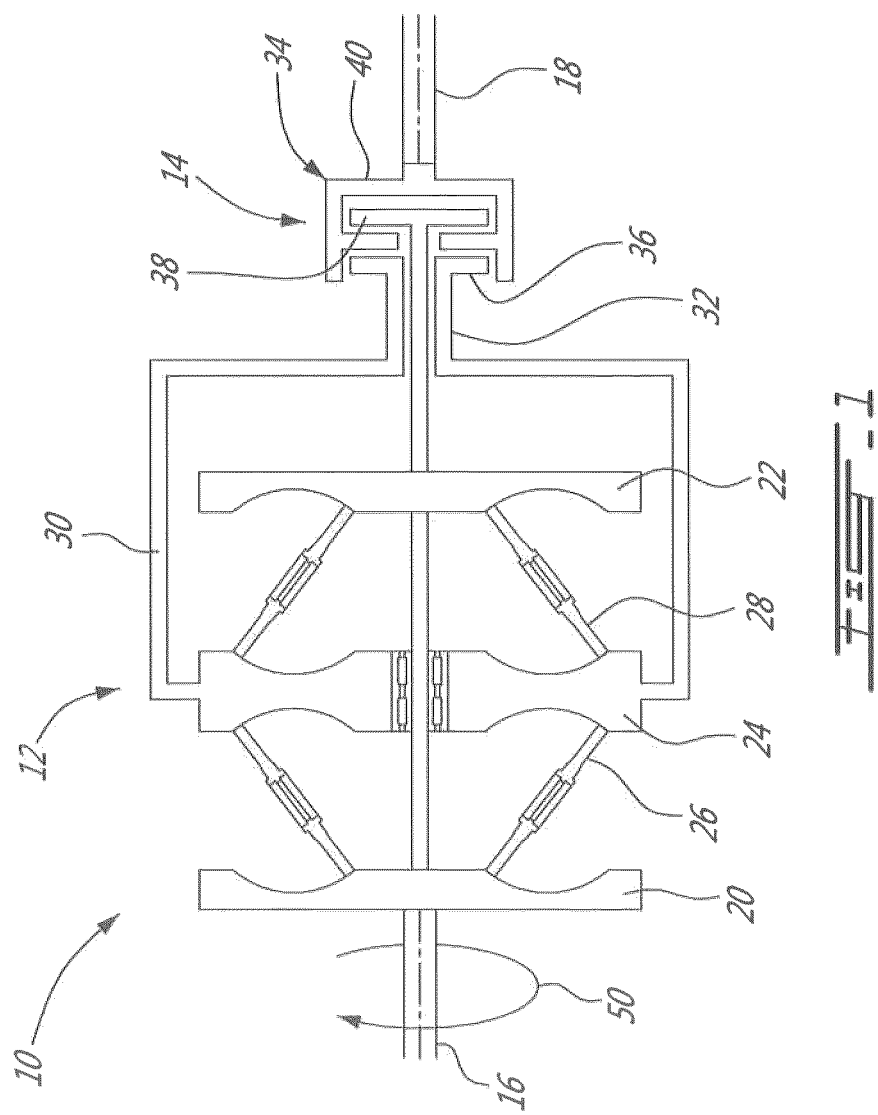
FIG. 1 is a schematic view of a drive assembly according to a first illustrative embodiment; the drive assembly being shown in a neutral position.

An object is generally to provide an improved drive assembly. More specifically, an object is to provide a drive assembly provided with a CVT and a direction reversing mechanism.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine, a turbine engine, an electric motor, or any other mechanical power production element or assembly.

It is to be noted that the expression "CVT", standing for Continuously Variable Transmission is to be construed herein and in the appended claims as any type of CVT including dual-cavity full toroidal CVT, half-toroidal CVT and single cavity toroidal CVT.

It is to be noted that the expression "overdrive" when used herein in the context of a CVT, is to be construed herein and in the appended claims as a condition where the CVT ratio is such that the CVT output speed is higher than the CVT input speed.

It is to be noted that the expression "underdrive" when used herein in the context of a CVT, is to be construed herein and in the appended claims as a condition where the CVT ratio is such that the CVT output speed is lower than the CVT input speed.

It will also be noted that the expressions "fixed disk", when used herein and in the appended claims in the context of clutch technology, may be viewed as any element or group of elements constituting a clutch driving member. Similarly, the expressions "movable disk", when used herein and in the appended claims in the context of clutch technology, may be viewed as any element or group of elements constituting a clutch driven member.

The expression "connected" should be construed herein and in the appended claims broadly so as to include any cooperative or passive association between mechanical parts or components. For example, such parts may be assembled together by direct coupling, or indirectly coupled using further parts. The coupling can also be remote, using for example a magnetic field or else.

Other objects, advantages and features of the drive assembly provided with a continuously variable transmission and a direction reversing mechanism will become more apparent upon reading of the following non-restrictive description of illustrative embodiments thereof, given by way of example only with reference to the accompanying drawings.

Generally stated, illustrative embodiments illustrated herein are concerned with a drive assembly including a CVT and a direction reversing mechanism. More specifically, the direction reversing mechanism is such that the output of the drive assembly may be rotated at variable speed in a first direction and at a fixed speed in a second direction.

Turning now to FIG. 1 illustrating a schematic drive assembly 10 according to a first illustrative embodiment shown in a neutral position. The drive assembly 10 includes a CVT 12, a direction reversing mechanism 14, an input shaft 16 and an output shaft 18. Of course, the CVT 12 and mechanism 14 are conventionally contained in a casing (not shown).

The CVT 12 illustrated in FIG. 1 is a dual-cavity toroidal CVT which is provided with two drive disks 20, 22 having a toroidal surface and being so mounted to the input shaft 16 as to rotate therewith. A driven disk 24 having opposite toroidal surfaces respectively facing the drive disks 20 and 22 and rotatably mounted to the input shaft 16 is also provided. The three disks being linked by rollers 26, 28 in contact with their respective toroidal surfaces. The angle of the rollers with respect to the drive and driven disks dictates the speed ratio between the driven and drive disks. The CVT 12 is also provided with an output drum 30 mounted to the driven disk 24 and provided with a hollow output shaft 32 coaxial with the input shaft 16.

One skilled in the art will understand that the CVT 12 is schematically illustrated herein and that other elements not shown herein are required for the adequate operation of the CVT 12.

The direction reversing mechanism 14 consists of a three-position clutch 34 provided with first and second fixed disk 36, 38 and with a movable disk 40. As can be seen from FIG. 1, the first fixed disk 36 is associated with the hollow output shaft 32 of the output drum 30, the second fixed disk 38 is associated with the input shaft 16 and the movable disk 40 is associated with the output shaft 18 of the drive assembly 10.

The first fixed disk 36 may be viewed as a reverse input of the direction reversing mechanism 14, the second fixed disk 38 as the forward input and the movable disk 40 as the output thereof. The input shaft 16 and the hollow output shaft 32 are coaxially mounted one inside the other to thereby allow an inline configuration of the drive assembly 10. Of course, other arrangements are possible to yield other configurations.

As will be apparent to one skilled in the art, a friction clutch assembly is illustrated in the appended figures. However, other types of clutches can be used.

Also, as will be understood by one skilled in the art, an arrangement of two two-position clutches could be used to replace the three-position clutch 34. Similarly, a two-position clutch similar to the clutch 34 but lacking the neutral position could also be used.

The direction reversing mechanism 14 also includes an actuator (not shown) used to axially move the movable disk 40. As non-limiting examples, a conventional fork actuator or a solenoid-type actuator could be used. Of course, other types of actuators could also be used.

A separation wall (not shown) can optionally be provided between the CVT 12 and the direction reversing mechanism 14. One of the reasons of having such a separating wall is to prevent contamination of the traction oil present in the CVT 12 by the oil potentially containing metal particles present in the direction reversing mechanism 14. Indeed, these oil compositions may be different and the mechanical interactions present in the direction reversing mechanism 14 tend to generate metal particles that could be detrimental to the life expectancy of the CVT 12.

It is to be noted that, if adequate filtration is used and if the traction oil and the oil of the direction reversing mechanism are the same, a separation wall is not required.

One skilled in the art will understand that the direction reversing mechanism 14 is schematically illustrated herein and that other elements not shown herein are present in the direction reversing mechanism 14.

Figure 2:
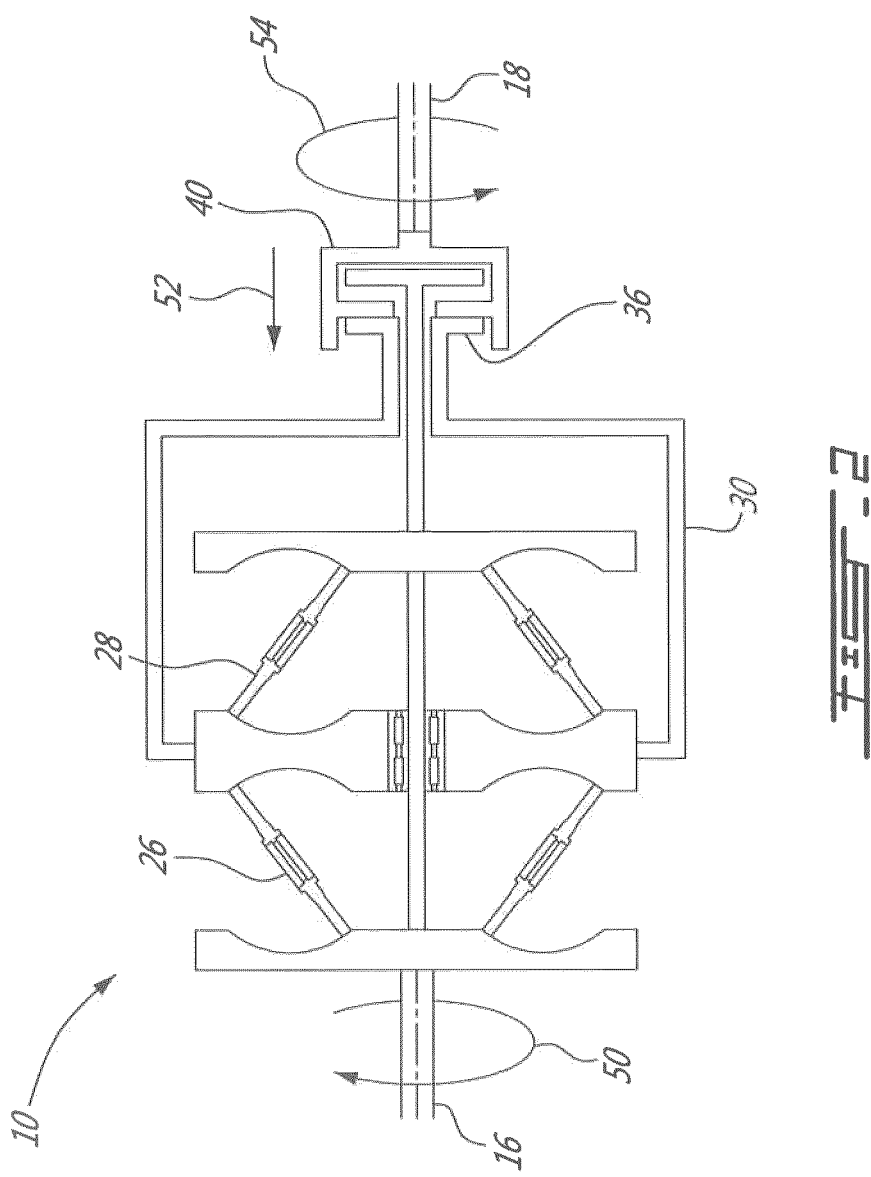
FIG. 2 is a schematic view of the drive assembly of FIG. 1, shown in a position where the output shaft rotates in a first direction.
Figure 3:
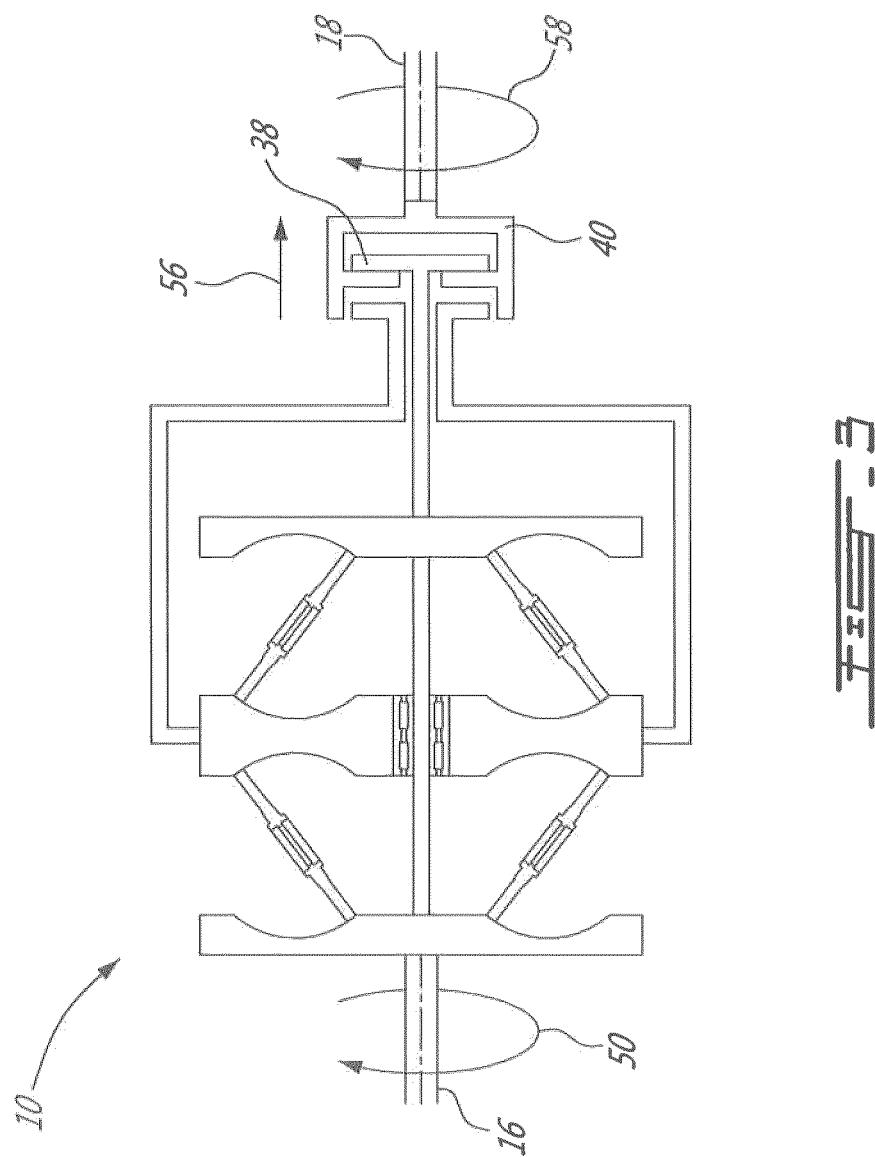
FIG. 3 is a schematic view of the drive assembly of FIG. 1, shown in a position where the output shaft rotates in a second direction.

Turning now to FIGS. 1 to 3 of the appended drawings, the operation of the drive assembly 10 will be described.

In FIG. 1, the movable disk 40 of the direction selection mechanism 14 is in a neutral position. Accordingly, even though the input shaft 16 of the drive assembly 10 rotates (see arrow 50) via its interconnection with a prime mover (not shown), the output shaft 18 does not rotate and is freewheeling.

FIG. 2 illustrates the direction reversing mechanism in a first or reverse position. As can be shown by arrow 52, the movable disk 40 has been actuated so that there is an interconnection between the movable disk 40 and the first fixed disk 36. Accordingly, rotation of the input shaft 16 (see arrow 50) causes the rotation of the output shaft 18 in a first direction (see arrow 54). It is to be noted that because of the inherent change of direction of toroidal CVTs, the first direction of rotation (arrow 54) is opposite the direction of rotation of the input shaft 16. It is also to be noted that the rotation speed of the output shaft 18 can vary depending on the angular position of the rollers 26-28.

One skilled in the art will understand that the type of interconnection between the movable disk and the first fixed disk depend on the clutch technology. Accordingly, this interconnection could be mechanical or via friction, for example.

FIG. 3 illustrates the direction reversing mechanism in a second or forward position. As can be shown by arrow 56, the movable disk 40 has been actuated so that there is an interconnection between the movable disk 40 and the fixed disk 38. Accordingly, rotation of the input shaft 16 (see arrow 50) causes the rotation of the output shaft 18 in a second direction (see arrow 58), which is reversed with respect to the first rotation direction of the output shaft 18 illustrated in FIG. 2. It is to be noted that since the output shaft 18 is thus connected to the input shaft 16, these shafts rotate at the same speed and in the same direction.

Turning now to FIGS. 4 to 6 of the appended drawings, a drive assembly 100 according to a second illustrative embodiment will be described.

As can be seen from these figures, the drive assembly 100 is designed to operate fan blades 102. Of course, the drive assembly 100 could operate other mechanical element (not shown).

The drive assembly 100 includes a CVT 104, a direction reversing mechanism 106 and an input shaft 107.

The CVT 104 illustrated in FIG. 4 is a dual-cavity toroidal CVT which is provided with two driven disks 108, 110 having a toroidal surface. A drive disk 112 having opposite toroidal surfaces respectively facing the driven disks 108 and 110 and associated to the input shaft 107 via a rotatable housing 114 surrounding the CVT 104. The three disks 108, 110 and 112 are linked by rollers 116-118 in contact with their respective toroidal surfaces. Again, the angle of the rollers with respect to the drive and driven disks dictates the speed ratio between the driven and drive disks. The CVT 104 is also provided with an output shaft 119 connected to both driven disks 108, 110.

One skilled in the art will understand that the CVT 104 is schematically illustrated herein and that other elements not shown herein are present in the CVT 104.

The direction reversing mechanism 106 includes a three-position clutch 120 provided with first and second fixed disk 122, 124 and with a movable disk 126. As can be seen from FIG. 4, the first fixed disk 122 is associated with the input shaft 107 since it is mounted to the rotatable housing 114, the second fixed disk 124 is associated with the output shaft 119 of the CVT 104 since it is mounted on an output drum 128 associated with the shaft 119 and the movable disk 126 receives the blades 102.

The direction reversing mechanism 106 also includes an actuator (not shown) used to axially move the movable disk 126. As non-limiting examples, a conventional fork actuator or a solenoid-type actuator could be used. Of course, other types of actuators could be used.

One skilled in the art will understand that the direction reversing mechanism 106 is schematically illustrated herein and that other elements not shown herein are present in the direction reversing mechanism 106.

Turning now to FIGS. 4 to 6 of the appended drawings, the operation of the drive assembly 100 will be described.

In FIG. 4, the movable disk 126 of the direction selection mechanism 106 is in a neutral position. Accordingly, even though the input shaft 107 of the drive assembly 100 rotates (see arrow 130) via its interconnection with a prime mover (not shown), the fan blades 102 do not rotate.

FIG. 5 illustrates the direction reversing mechanism 106 in a first position. As can be shown by arrow 132, the movable disk 126 has been actuated so that there is an interconnection between the movable disk 126 and the first fixed disk 124. Accordingly, rotation of the input shaft 107 (see arrow 130) causes the rotation of the fan blades 102 in a first direction (see arrow 134). Again, because of the inherent change of direction occurring in a toroidal CVT, the first direction of rotation (arrow 134) is opposite the direction of rotation of the input shaft 107. It is also to be noted that the rotation speed of the fan blades 102 can vary depending on the position of the rollers 116-118.

FIG. 6 illustrates the direction reversing mechanism 106 in a second position. As can be shown by arrow 136, the movable disk 126 has been actuated so that there is an interconnection between the movable disk 126 and the fixed disk 122. Accordingly, rotation of the input shaft 107 (see arrow 130) causes the rotation of the fan blades 102 in a second direction (see arrow 138) which is reversed with respect to the first rotation direction of the fan blades 102 illustrated in FIG. 5. It is to be noted that since the fan blades 102 are thus connected to the input shaft 107, the fan blades 102 rotate at the same speed as the input shaft 107.

Typically, a drive assembly such as 100 could be used for radiator cooling in agricultural equipment where a variable speed of fan rotation is required (first position illustrated in FIG. 5) and where a forward direction of rotation (second position illustrated in FIG. 6) is used to clear debris of the radiator when required.

Turning now to FIG. 7 of the appended drawings, a schematic drive assembly 200 according to a third illustrative embodiment will be described. Since the drive assembly 200 is very similar to the drive assembly 10 of FIGS. 1 to 3, only the differences therebetween will be described.

While the drive assembly 200 includes a CVT 12 and a direction reversing mechanism 14, these elements are interconnected via two pairs of gears having different ratios.

More specifically, the shaft 32 of the CVT is connected to the fixed disk 38 via meshed gears 202 and 204 while the input shaft 16 is connected to the fixed disk 36 via meshed gears 206 and 208.

Accordingly, it is possible to choose the correct gear ratios to achieve the desired range of rotation speed of the output shaft 18.

It is to be noted that since there is an inherent rotation direction change in a pair of meshed gears, the direction of rotation of the output shaft 18 is in the same direction as the shaft 16 when the fixed disk 38 is in contact with the movable disk 40 and that the speed of the output shaft 18 depends on the angular position of the rollers 26, 28.

Conversely, when the movable disk 40 is in contact with the fixed disk 36, the output shaft 18 and the shaft 16 rotate in opposite direction and the rotation speed of the output shaft 18 depends on the rotation speed of the shaft 16 and of the ratio of the meshed gears 206 and 208.

Finally, turning to FIG. 8 of the appended drawings, a schematic drive assembly 300 according to a fourth illustrative embodiment will be described. Since the drive assembly 300 is very similar to the drive assembly 10 of FIGS. 1 to 3, only the differences therebetween will be described.

In the drive assembly 300, the hollow output shaft 32 is connected to the fixed disk 36 of the direction reversing mechanism 302.

The other fixed disk 38 is connected to the input shaft 16 via a planetary gear set 304 including a sun gear 306 connected to the shaft 16, a ring gear 308 which is fixed to a casing 310, planet gears 312 meshed with both the sun gear 306 and the ring gear 308 and a planet carrier 314 connected to the fixed disk 38.

The direction reversing mechanism 302 also includes a movable disk 316 that can conventionally be placed in contact with either fixed disk 36 and 38 and that includes a gear 318 meshed with the output gear 320 mounted to the output shaft 322.

Accordingly, when the movable disk 316 is in contact with the fixed disk 36, the output shaft 322 rotates in the same direction as in input shaft 16 at a speed depending on the angular position of the rollers 26 and 28.

On the other hand, when the movable disk 316 is in contact with the fixed disk 38, the output shaft 322 and the shaft 16 rotate in opposite direction and the rotation speed of the output shaft 322 depends on the rotation speed of the shaft 16 and of the fixed ratio of the planetary gear set 304.

It will also be understood that while a dry clutch type assembly was described herein, other types of clutches could be used. For example, a dog clutch, a wet clutch, a magnetic clutch and synchronizer to ease shifting or a wet clutch could be used.

The appended drawings illustrate the CVT as being a dual-cavity toroidal CVT. One skilled in the art will understand that other CVT technologies could be used in the drive assemblies described herein.

It is to be understood that the drive assembly is not limited in its application to the details of construction and parts illustrated in the accompanying drawings and described hereinabove. The drive assembly is capable of other embodiments and of being practiced in various ways. It is also to be understood that the phraseology or terminology used herein is for the purpose of description and not limitation. Hence, although the drive assembly has been described hereinabove by way of illustrative embodiments thereof, it can be modified, without departing from the spirit, scope and nature of the subject invention.

What is claimed is:

1. A drive assembly used to drive a fan, the drive assembly comprising:
   an input shaft;
   a CVT provided with an input associated with the input shaft and with an output;
   an output shaft connected to the fan;
   a direction reversing mechanism having a forward input associated with the input shaft, a reverse input associated with the output of the CVT, and an output associated with the output shaft; the direction reversing mechanism being movable between a forward position where the output of the direction reversing mechanism is interconnected with the forward input and a reverse position where the output of the direction reversing mechanism is interconnected with the reverse input.

2. A drive assembly as recited in claim 1, wherein the direction reversing mechanism includes a third position where the output of the direction reversing mechanism is freewheeling.

3. A drive assembly as recited in claim 2, wherein the direction reversing mechanism includes a three-position clutch.

4. A drive assembly as recited in claim 3, wherein the three-position clutch includes a first fixed disk connected to output of the CVT, a second fixed disk connected to the input shaft and a movable disk connected to the output shaft.

5. A drive assembly as recited in claim 4, wherein the first fixed disk is connected to the output of the CVT via a pair of meshed gears.

6. A drive assembly as recited in claim 4, wherein the second fixed disk is connected to the input shaft via a pair of meshed gears.

7. A drive assembly as recited in claim 4, wherein the second fixed disk is connected to the input shaft via a planetary gear set.

8. A drive assembly as recited in claim 7, wherein the planetary gear set includes a sun gear connected to the input shaft, a fixed ring gear, planet gears meshed with both the sun gear and the ring gear and a planet carrier connected to the second fixed disk.

9. A drive assembly as recited in claim 1, wherein the CVT is a toroidal CVT.

* * * * *